United States Patent Office 3,849,386
Patented Nov. 19, 1974

3,849,386
ONE-PACKAGE MOISTURE ACTIVATABLE POLYSULFIDE SEALANTS
Philip Bernstein, Yardley, and Alan E. Varker, Philadelphia, Pa., assignors to ESB Incorporated
No Drawing. Filed Nov. 5, 1973, Ser. No. 412,672
Int. Cl. C08g 23/00
U.S. Cl. 260—79.1                                    5 Claims

ABSTRACT OF THE DISCLOSURE

Moisture activatable polysulfide sealants comprising a curable, liquid polysulfide polymer; a dormant curing agent; an alkaline earth hydroxide and a hydrolizable amine salt of an acid.

BACKGROUND OF THE INVENTION

(1) Field of the invention

This invention relates to a moisture activatable polysulfide sealant comprising a curable, liquid polysulfide polymer; a dormant curing agent such as magnesium oxide or zinc oxide; an alkaline earth hydroxide and a hydrolizable amine salt of an organic or inorganic acid.

This sealant of this invention is capable of a surface cure after overnight exposure and capable of developing high tensile strengths at room temperature.

(2) Description of the prior art

Liquid polysulfide polymers (LPs) are cured through the action of oxidizing agents on the terminal thiol (—SH) groups. These thiol groups interact to form disulfide groups (—SS—) thereby coupling the short chain segments into long chains resulting in a polymer with elastomeric properties. The agents which are most frequently used to produce this cure are oxygen donating compounds such as lead dioxide and cumene hydroperoxide.

Both the inorganic oxide and organic peroxide curing reactions are accelerated by a humid, alkaline environment. Various amines have been added to liquid polymer compounds to maintain the requisite high alkalinity during cure.

Cure times at room temperature with lead dioxide have been seen to range from 5 minutes to 16 or more hours depending on the ratio of LP to dioxide and on the amounts of elemental sulfur or other components added to the compounded polymer. With cumene hydroperoxide, cure times have been known to range up to 24 hours.

Moisture-activated polysulfide based sealants have been prepared with calcium peroxide and other alkaline earth peroxides (U.S. 3,349,047); with zinc oxide particles encapsulated in a water soluble coating and accelerated by an amine absorbed on molecular sieve (Belg. 658,738); with metal dryer soaps and amine chelating agents (Brit. 984,511); with zinc peroxide or calcium peroxide with barium oxide or hydroxide (Brit. 1,060,714) and with a very high molecular weight polysulfide modified with small amounts of "air-drying" low molecular weight polysulfide.

Some metal oxide or dioxide containing LP blends are reputed to have service lives or shelf lives of a week or two (U.S. 3,282,902) but this is the exception rather than the rule.

Once the oxidant has been blended into the LP, the cure reaction is normally initiated almost immediately. Accelerators and retarders can modify the rate at which the final cured properties are developed, but the useful working life of the compounded product is usually less than four hours.

A moisture activatable polysulfide sealant has now been discovered which is flexible; which has extended storage life at room temperature; but, which will surface or skin cure after overnight exposure to ambient atmospheric conditions.

SUMMARY OF THE INVENTION

A moisture activatable polysulfide sealant comprising a curable, liquid polysulfide polymer; a dormant curing agent; an alkaline earth hydroxide; and a hydrolizable amine salt of an acid.

DESCRIPTION OF THE INVENTION

A technique for inactivating amine catalysts is the conversion of amine accelerators ($RNH_2$) to "inert" salts ($RNH_2 \cdot HA$) by neutralization with an acid (HA). The modified amine is unreactive toward the sealant components thereby extending the useful storage life of the compounded sealant. Activation of the system is achieved through moisture absorbed from the atmosphere. To insure that the absorbed moisture will produce an alkaline environment in which the amine salt can be hydrolized to the free active amine, a weak basic alkaline earth hydroxide such as calcium hydroxide is included in the compounded sealant. The interaction of these components is illustrated in the following simplified reactions:

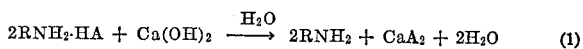

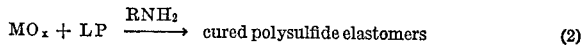

The additional water produced in reaction (1) can aid in accelerating the oxide cure. The calcium salt produced remains as an inert filler in the sealant.

In general synthetic rubbers are prepared by reacting polyfunctional organic compounds with alkali metal or alkaline earth metal sulfide solutions to produce high molecular weight polymers having the recurring unit (RSS), wherein R is usually a divalent organic radical that may vary widely in its specific structure, and SS represents a disulfide linkage through which the organic radicals are interconnected. Although the organic radicals represented by the symbol R above may vary considerably in their specific structure, the commercially important polymers are usually made from certain aliphatic halides, e.g. alkylene chlorides such as ethylene dichloride and its homologues or oxygen containing aliphatic dichlorides such as bis(beta-chloroethyl) formal.

The polysulfide polymers of the present invention are primarily liquid polysulfide polymers which can be obtained from the high molecular weight polysulfide polymers referred to above by a splitting process described in U.S. 2,466,963. The high molecular weight polymers can be split to form polythiolpolymercaptan polymers having molecular weight of the order of 500 to 25,000 and which are viscous liquids having viscosities within the range 300 to 100,000 centipoises at 25° C.

While many such liquid polymers can be prepared by art known processes, the polymers of primary commercial importance are generally those such as LP–2 polymer described in "Industrial and Engineering Chemistry," vol. 42, page 2217 (1950) and vol. 43, page 324 (1951) by Fettes and Jorczak. These polymers are generally prepared from bis(beta-chloroethyl) formal and are essentially composed of recurring

groups and have free mercapto terminals through which they may be cured to form a solid elastomer. In the manufacture of these polymers a small percentage of trichloropropane is commonly mixed with the bis(beta-chloroethyl) formal to provide cross-linking.

For the purpose of this invention the term liquid polysulfide polymers refers not only to mercapto terminated polymers of recurring groups, such as bis(ethyleneoxy) methane, bis(butyleneoxy)methane, bis(ethylene)oxy and bis(butylene)oxy groups, linked by disulfide linkages but also those of such polymers which have an average molecular weight of approximately 2,000 to 10,000 and preferably 3,500 to 8,000.

This dormant curing agent of the present invention is one which is incapable alone of curing the polysulfide polymer at room temperature but which can affect cure by exposure to free amine. Suitable dormant curing agents include zinc oxide and magnesium oxide as well as other oxides and metal peroxides which can be readily identified by those skilled in the art. Zinc oxide is preferred. It shold be noted that ZnO is ordinarily not considered a curing agent. In selecting a curing agent those which cure too fast, for example those which might cure in the tube before application, e.g. $BaO_2$, $MnO_2$, should be avoided, and only dormant curing agents should be used.

In order to activate the dormant curing agent it is necessary that a compound be present in the sealant composition which is capable of providing free amine groups which can activate the cure. For this purpose, any amine compound, either aromatic or aliphatic may be used so long as they can: be added to the sealant as hydrolizable salts of organic or inorganic acid; be capable of reacting with the moisture in the air to release free amine; and be capable of releasing sufficient amine to initiate the action of the dormant curing agent. These amine compounds may be hydrolizable salts of acids such as hydrochloric acid, phosphoric acid, sulfuric acid, the amine sulfate being preferred. Preferred amines include diethylenetriamine, N-butylamine, ethylene diamine, and aromatic tris(dimethylaminomethyl) phenol and dipropylene-triamine. The free amines released from the amine salt upon its contact with moisture in the air will react with the mercaptan ends of the polysulfide yielding mercaptides which will then react with the curing agent converting the mercaptan terminals to disulfide. At the same time the alkaline earth hydroxide present in the sealant will bind up all the acid released from the amine salt and the corresponding alkaline earth salt will be formed.

Any weakly basic alkaline earth hydroxide may be used in the present invention so long as it will form a salt with the remaining portion of the amine compound and so long as it is present in an amount sufficient to bind up all of the acid released from the amine salt at the appropriate times (i.e., at least a stoichiometric amount of the basic alkaline earth hydroxide must therefore be present in the sealant). Suitable hydroxide include barium, calcium, magnesium and the like, calcium being preferred.

All of the above listed ingredients of the sealant may be milled and mixed in any appropriate manner with the proviso that such milling and mixing be carried out in a relatively dry atmosphere to prevent the activation of the amine salt, e.g. below about 40% relative humidity.

The amount of hydrolizable amine salt present in the sealant depends upon the amount of free amine desired but is normally from about 1 to about 10 weight percent based on the total weight of the sealant and should be capable of producing from about .10 to about 1.0 weight percent of free amine when it is hydrolized. Preferably, the amount of free amine which may be liberated from the amine salt is about .5 weight percent.

The amount of alkaline earth hydroxide present is at least stoichiometrically equal to the amount of amine salt present.

The remainder of the sealant comprises liquid polysulfide polymer and dormant curing agent, from about 5 to about 25 parts of the curing agent being present for each 100 parts of polysulfide polymer. Preferably about 10 parts of the curing agent are present for each 100 parts of polysulfide polymer.

Additionally, inert fillers and pigments may be added, for example to increase the sealant viscosity or to reinforce the cured material. Typical of such additives are asbestos powder and titanium dioxide. If it is desired to add such a material the particular material and amount of same to be added will be readily determined by one skilled in the art depending on the utility to which the sealant is to be put.

A typical sealant formulation could comprise 100 parts Thiokol "LP-32" (similar to LP-2 described herein)

50 parts asbestos powder
10 parts zinc oxide
10 parts titanium dioxide
4 parts diethylenetriamine sulfate
4 parts calcium hydroxide.

EXAMPLES

The following examples are intended to be merely illustrative of the invention and not in limitation thereof. Unless otherwise indicated, all quantities are by weight.

EXAMPLE 1

Compounding of sealants

A three-roll paint mill was used to blend the components of various sealant compositions in an area of low humidity i.e. below 50%. The dry ingredients, the amine salt, the calcium hydroxide, and the metal oxide were preblended in a plastic beaker by hand mixing with a metal spatula. The liquid polysulfide polymer (LP) was loaded onto the paint mill and the rolls adjusted to keep the nip small and the band large. The preblended powders were then carefully sprinkled onto the nip to form a doughy mix. The rear roll was tightened in stages to build up the nip. When the mix in the nip appeared visually homogeneous (usually 10–15 minutes milling were required), the take-off knife was engaged and the compounded mix collected in a plastic beaker. The mix was then packed into the open rear end of the collapsible aluminum dispensing tubes using a stiff bladed spatula. The tube end was tapered, the edge rolled twice and crimped tight. Milling should be done as rapidly as possible to avoid any undesirable moisture absorption.

Testing (a) *Initial testing for surface cure.*—Samples of each compounded sealant were extruded as beads into aluminum dishes. The extruded bead measured about 2½ inches long by ¼ inch to ⅜ inches diameter. Two beads for each formulation were extruded into separate dishes.

One speciment of each was merely allowed to remain undisturbed in the laboratory under ambient atmospheric conditions. The relative humidity in the laboratory was generally below 50 percent, often below 30 percent. The other specimen was placed beside a beaker containing water and both covered by a large crystallizing dish to maintain a relatively high humidity around the test bead.

The extent of surface cure on the specimens was determined by touch. The loss of tack indicated surface cure.

(b) *Cure after oven storage.*—The sample tubes of sealant were stored in an oven at 65° C. for two weeks. This simulated storage for approximately 6 months at room temperature.

After this period, test beads were again extruded. Some formulations had completely cured during storage and could not be extruded. Skin or surface cure tests were performed on the formulations which had survived the storage regime.

The formulations tested are listed in Table I below with comments on color and consistency before and after oven storage for 2 weeks at 65° C.

TABLE I

[Sealant formulations (all contained 50 phr.[1] asbestos powders)]

| Formulation | Oxide (10 phr.) | Amine sulfate[2] | Pigment | Comments |
|---|---|---|---|---|
| A | $MnO_2$ | 2 phr. DETA (diethylenetriamine). | | Black extrudable before, cure solid after storage. |
| B | ZNO | 4 phr. IBPA (iminobispropylamine). | 10 phr. $TiO_2$ | White extrudable before, white extrudable after storage. |
| C | ZNO | 4 phr. DETA | 10 phr. $TiO_2$ | Do. |
| D | ZNO | | 10 phr. $TiO_2$ | Do. |
| E | International Paint Co., "Interlux" #22 white. | | | Do. |

[1] phr=Parts per hundred parts resin.
[2] An equivalent amount of $Ca(OH)_2$ was included in each formulation.

NOTE.—Formulation C is within the scope of the claimed invention.

(c) *Tensile testing.*—The adhesive or tensile strength of the test sealant formulations was measured by the tensile button test (ASTM-D-897-49).

Mild steel buttons with a one square inch surface were bonded together with the test adhesive. A short spiral length (2 inches) of 15-mil-thick wire was used as a spacer to keep the adhesive thickness uniform in all tests. The assembled adhesive "sandwich" was then stored under a large inverted glass baking dish with small beaker containing water to maintain the required high humidity.

The tensile button bonds were pulled apart in special grips on a Tinius Olsen X-Y Electromatic Universal Testing Machine. The breaking load was taken as the "tensile strength" of the cured sealant.

Tensile strengths of freshly prepared sealant were determined after one day, 14 days and 28 days. Tensile strength of the sealant aged two weeks at 65° C. was determined after 28 days.

Table II below lists the tensile strengths of the sealants at various times after application, before and after oven storage.

TABLE II

[Tensile strength (p.s.i.) of sealant formulations (5 specimens each)]

| Formulation (see Table I) | Initial testing | | | After 2 weeks at 65° C. |
|---|---|---|---|---|
| | 1 day cure | 14 day cure | 28 day cure | 28 day cure |
| A | 32 | 81 | | Cured solid in oven. |
| B | 0 | 40 | 67 | Not tested. |
| C | 29 | 123 | 214 | 70. |
| D | 0 | 0 | 0 | Not tested. |
| E | 21 | 63 | 64 | 34. |

All of the formulations tested were surface cured within 48 hours exposure to the test humidity. With most a tack-free surface was noted within 24 hours. Painting or spraying the surface of the test bead with water brought about surface cure within 16 hours.

Comparing formulations B, C and D, it is apparent that ZnO does not produce cured elastomer in the absence of the amine salt even after 28 days exposure to the test conditions. With the IBPA salt, the initial cure rate is slow, but beyond the induction period, it parallels the development of cure in the reference system E in the long run.

Formulation C, containing the DETA salt according to the present invention, has as high an initial value as formulation A and the reference but the higher strengths after 14 and 28 days are quite remarkable. The final 28 day strength is three times greater than that of the reference material.

Formulation A, although exhibiting good initial strength data, did not survive the oven storage test. Formulation A, in fact, cured within 4 weeks at room temperature so that by the time a set of test-buttons became available, the sealant could not be extruded from the tube.

Formulation D containing ZnO with no amine salt does not cure.

Formulation C containing ZnO and DETA sulfate has acceptably high initial tensile strength and achieves the highest tensile strengths of any formulation. After oven storage, the tensile strength is twice that of the reference system, Formulation E.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. Moisture activatable polysulfide sealants comprising a curable, liquid polysulfide polymer; a dormant curing agent; an alkaline earth hydroxide and a hydrolizable amine salt of an acid wherein:
   (a) the polysulfide polymer is selected from polysulfide polymers having the recurring unit (RSS), wherein R is a divalent organic radical and SS is a disulfide linkage, and mercapto terminated polysulfide polymers having an average molecular weight of from about 2,000 to about 10,000;
   (b) the dormant curing agent is incapable alone of curing the polysulfide polymer at room temperature but can effect such cure by exposure to free amine;
   (c) the hydrolizable amine salt is a salt of organic or inorganic acid, capable of reacting with moisture in the air to release sufficient free amine to initiate the action of the dormant curing agent;
   (d) the alkaline earth hydroxide is a weakly basic hydroxide capable of forming a salt with the acid released from the hydrolizable amine salt of (c) when said amine salt releases free amine upon reaction with moisture in the air; and
   (e) the amount of amine salt present is from about 1 to about 10 weight percent based on the total weight of the sealant; the amount of alkaline earth hydroxide present is at least stoichiometrically equal to the amount of amine salt present; and the remainder of the sealant comprises the liquid polysulfide polymer and dormant curing agent, from about 5 to about 25 parts of the curing agent being present for each 100 parts of the polysulfide polymer.

2. Sealants according to claim 1 wherein the amine salt is selected from the group consisting of diethylene triamine, N-butylamine, ethylene diamine, aromatic tris(dimethyl amino methyl) phenol and dipropylene-triamine.

3. Sealants according to claim 1 wherein the curing agent is selected from the group consisting of zinc oxide and magnesium oxide.

4. Sealants according to claim 1 wherein the alkaline earth hydroxide is selected from the group consisting of barium hydroxide, calcium hydroxide and magnesium hydroxide.

5. Sealants according to claim 1 wherein the amine salt is selected from the group consisting of diethylene triamine, N-butyl amine, ethylene diamine, aromatic tris(dimethylaminomethyl) phenol and dipropylene-triamine; the curing agent is selected from the group consisting of zinc oxide and magnesium oxide; and the alkaline earth hydroxide is selected from the group consisting of barium hydroxide, calcium hydroxide and magnesium hydroxide.

References Cited

UNITED STATES PATENTS

| 3,402,155 | 9/1968 | Kutch | 260—79 |
| 3,654,241 | 4/1972 | Doughty et al. | 260—79 |
| 3,225,017 | 12/1965 | Seegman et al. | 260—79 |

MELVYN I. MARQUIS, Primary Examiner

U.S. Cl. X.R.

260—37 R, 79